United States Patent Office 3,424,669
Patented Jan. 28, 1969

3,424,669
REFORMING-AROMATIZATION PROCESS WITH SULFIDED CATALYST
James L. Carter, Chatham, and John H. Sinfelt, Berkeley Heights, N.J., assignors to Esso Research and Engineering Company, a corporation of Delaware
No Drawing. Filed Jan. 3, 1967, Ser. No. 606,591
U.S. Cl. 208—65  4 Claims
Int. Cl. C10g 39/00, 35/08

ABSTRACT OF THE DISCLOSURE

A naphthenic gasoline is reformed in at least two stages over catalysts of platinum on a refractory support such as silica or alumina. The first stage catalyst is free of sulfur while the second stage catalyst is sulfided.

---

This invention pertains to the catalytic conversion of hydrocarbons. More particularly, this invention pertains to the catalytic reforming of hydrocarbon fractions boiling within the motor fuel or naphtha range. More specifically still, this invention describes a method of hydroforming in which maximum conversion of paraffinic hydrocarbons to aromatic hydrocarbons is achieved without impeding any other aspects of the hydroforming process. This is achieved by sulfiding certain reactors in a train of hydroforming reactors. In particular, the tail-end reactors in a train of hydroforming reactors are sulfided and operated in a manner such that the conversion of paraffins to aromatics is substantially enhanced.

Hydroforming is now a matter of record and commercial practice in this country. Basically, the operation involves the contacting of a naphtha, either virgin, cracked, Fischer-Tropsch or any mixtures thereof, with a solid catalytic material. The contacting takes place at elevated temperatures and elevated pressure in the presence of added or recycled hydrogen. This hydrogen has been essential in the past since it prevents the deactivation of the hydroforming catalyst. The process itself does produce substantial amounts of hydrogen and, in actuality, this is the source of the hydrogen which is recycled to repress deactivation of the catalyst by carbon formation.

The reactions involved in hydroforming are:
(1) Dehydrogenation of naphthenes to the corresponding aromatic hydrocarbons as where methylcyclohexane is dehydrogenated to form toluene;
(2) Isomerization of normal paraffins to form branched-chain paraffins or isomerization of ring compounds, such as ethylcyclopentane to form methylcyclohexane, which latter compound is then dehydrogenated to form toluene;
(3) Dehydrocyclization of paraffins to aromatics such as n-heptane to form toluene; and
(4) Hydrocracking of the higher boiling constituents of the feed to form lower boiling constituents.

Fixed bed hydroforming processes may be divided into three general classes, namely, non-regenerative, semi-regenerative and cyclic. The three processes differ most significantly in that the cyclic has an alternate or swing reactor which is so manifolded that it may replace any reactor within the system in order that it may be regenerated.

A great variety of catalysts may be used to hydroform a particular feedstream. These catalysts will subsequently be discussed in more detail; for the present, it may be stated that a preferred catalyst would contain 0.01 to 1.0 wt. percent platinum or 0.1 to 2.0 wt. percent palladium dispersed upon a highly pure alumina support such as is obtained from aluminum alcoholate, as per U.S. Patent No. 2,636,865, which is herein incorporated by reference. Other members of the platinum group, such as rhodium, iridium, etc., may be utilized but platinum or palladium are much preferred. The support may also be prepared from an alumina hydrosol prepared by hydrolyzing aluminum metal with dilute acetic acid in the presence of very small catalytic amounts of mercury. A suitable catalyst comprises about 0.2 to 0.8 wt. percent platinum widely dispersed upon alumina in the eta or gamma phase derived from a suitable aluminum alcoholate and contains between about 0.3 and 1.2 wt. percent chlorine, and has a total surface area of about 50 to 300 square meters per gram. However, a variety of other catalysts may be utilized, such as platinum on desurfaced silica-alumina.

The hydroforming catalysts which were first utilized tended to be extremely active. As a result, extremely large amounts of coke were produced. This coke tends to build up on the catalyst with the eventual result that the catalytic activity is extremely restricted. To counteract this build-up of coke on the catalyst, large amounts of hydrogen were passed through the hydroforming zone.

In U.S. Patent No. 3,155,605, this problem is solved in part. The patent teaches the addition of a reducible sulfur compound to a naphtha prior to reforming. The use of this controlled amount of sulfur aids in the behavior of the hydroforming catalyst since the presence of the sulfur temporarily poisons the platinum catalyst and reduces undesirable side reactions. No permanent detrimental effect on the platinum catalyst is observed.

In U.S. Patent 3,006,841, the patentee also stresses improvements which are to be gained by adding sulfur to a catalytic hydroforming zone. Patentee teaches that the addition of small amounts of a sulfur promoter to a reaction zone tends to maintain catalyst activity without any other deleterious effects. In fact, the sulfur addition greatly increases the life of the catalyst, and along with this ability to maintain activity the presence of the sulfur compound actually lowers the amount of carbonaceous material formed during the hydroforming reaction.

The above two patents are typical of processes currently making use of sulfur to prolong the effective life of a hydroforming catalyst. For the most part, prior art methods have taught the addition of sulfur along with the feedstream either on a continuous or intermittent basis. In this manner, the entire train of hydroformers is exposed to the presence of a sulfur-containing compound.

A hydroforming operation takes place in a train or series of hydroformers which usually comprises about 3 or 4 hydroforming zones. If desired, additional hydroforming zones may be added but for most operations, 3 or 4 such zones are sufficient.

The conversion of naphthenes to the corresponding aromatic hydrocarbons is the most preferred reaction in the initial zones of the train and even though considerable amounts of paraffins may be present in the first reaction zone, almost all the reaction in the initial zones concerns the conversion of naphthenes to aromatics. In the tail zones and in particular in the last hydroforming zone, the preferred reaction is the formation of aromatics from paraffins such as hexane or heptane. This latter reaction is extremely important if one is desirous of producing high yields of a high octane gasoline. Without effective conversion of paraffins to aromatics, octane improvement is obtained by hydrocracking the paraffins out of the gasoline boiling range to concentrate the aromatics already formed from naphthenes. This severely limits the yield of reformate obtainable when processing to very high octane levels.

It is well known that the aromatization of paraffins is favored by low hydrogen pressure, and that this leads to higher yields of a given octane number reformate. To take advantage of this, one can envision a combination process of mild reforming at conventional hydrogen pressures to convert naphthenes to aromatics, followed by a step to aromatize paraffins at low hydrogen pressures. However, catalyst activity declines very rapidly at low hydrogen pressures, and it is normally impractical to operate in this manner. A solution to this problems forms the basis of the present invention. It has unexpectedly been found that a sulfided platinum catalyst can be employed for the aromatization of paraffins at low hydrogen pressures or in the absence of added hydrogen, and still give good activity maintenance. In the application of this finding, only the tail reactor or reactors in the hydroforming train would be sulfided, such that the hydrocarbon stream entering said reactor or reactors would contain no more than about 5% naphthenes.

The presence of a sulfided catalyst in the initial reactors serves to poison the dehydrogenation of naphthenes to aromatic hydrocarbons which predominantly takes place in these initial reactors. In direct contrast, dehydrocyclization of paraffins to aromatics is not poisoned by the use of a sulfided catalyst. Thus, the instant invention requires the sulfiding of only the tail reactors in a chain of hydroforming reactors or zones. More specifically, according to this invention, only those reactors are sulfided which are exposed to a feedstream having a maximum of about 10% and preferably a maximum of about 5% naphthenes. This feedstream would contain about 10 to 70% by wt. of paraffins and preferably 35 to 60% by wt.

More particularly, in the process of the instant invention, a motor gasoline boiling in the range of 150° to 350° F. is a typical hydroforming feedstream. This feedstream contains about 15 to 75% of paraffins, about 15 to 75% of naphthenes, and about 2 to 20% of aromatics. When treated in a hydroforming train of three reactors, after passing through two of the reactors the feedstream has the following breakdown: paraffins, 10 to 70%; naphthenes, 1 to 25%; aromatics, 20 to 70%.

The catalyst utilized in general comprises at least one metal from the platinum group which is deposited on an inorganic refractory oxide, such as alumina, silica, or various combinations of alumina and silica which in turn may also contain small amounts of a halogen, boria or additional components designed to impart acidity to the catalytic composite. Other refractory oxides which are useful in the instant invention include zinc oxide, magnesia, zirconia, and thoria, as well as a support which comprises two or more inorganic refractory oxides such as silica-alumina, silica-magnesia, and silica-alumina-magnesia. The preferred halogen which may be utilized would be chlorine or fluorine or a mixture of both. The platinum group metal comprises about 0.01 to 2.0% by wt. of the catalyst. The major part of the catalyst is the support which usually varies between 99.98 and 96.0% by wt.; as indicated above, the support is usually a metal oxide such as alumina. Other elements, i.e., halogen, usually comprise about 0.01 to 2.0 wt. percent of the catalyst.

The catalyst in the tail reactor or reactors, those reactors into which the feedstream is introduced after about 90% by wt. of the naphthenes have been converted to aromatics should, according to the process of this invention, contain a sulfided catalyst.

A wide variety of sulfiding agents and techniques may be utilized to deposit the sulfur on the catalyst. The sulfur-containing compound by means of which the sulfur is deposited upon the catalyst may be $H_2S$, thiophene, carbon disulfide, various mercaptans, organic sulfides, or benzothiophene.

A satisfactory method of introducing the sulfur to the catalyst is in the form of a thiophene. Simple treatment with a gas containing $H_2S$ is also a convenient method. The sulfur-containing compounds may be passed over the catalyst in conjunction with the feedstream and deposited selectively from the feedstream itself. Alternatively, and in a preferred fashion, the catalyst is sulfided prior to the addition of the feedstream. It is, of course, within the scope of this invention to combine both techniques, sulfur in the feedstream and presulfiding to reach the desired sulfur level. A sulfur level (expressed as sulfur) of about 0.01 to 2.0 wt. percent on catalyst may be utilized with levels of sulfur of about 0.01 to 0.7 wt. percent preferred.

The sulfur may be added in several different fashions: (1) as a sulfur compound, e.g., thiophene, dissolved in the hydrocarbon stream and admitted to the reactor with hydrogen in a presulfiding step at 700°–1050° F., 1–40 atm. total pressure, and hydrogen to hydrocarbon ratio of 0.5 to 10; (2) as a $H_2$-hydrocarbon gas containing $H_2S$ in a presulfiding step at 700°–1050° F., 1–40 atm. total pressure; and (3) by continuous addition of a sulfur compound during the reforming period. However, the most preferred method is as follows. The platinum catalyst is sulfided with a hydrogen or hydrocarbon gas stream containing a small concentration of $H_2S$ at a temperature approximately equal to that employed in the subsequent reforming operation. A small concentration of make-up sulfur is added, e.g., as thiophene, with the hydrocarbon feed after the initial presulfiding treatment. The sulfiding step with $H_2S$ is performed on the fresh catalyst or on a freshly regenerated catalyst.

Conditions within the hydroformer may vary within relatively wide ranges. Pressure, for instance, may vary between 0 and 900 p.s.i.g. Temperatures within the hydroformer may also vary broadly. Generally, temperatures of 800° to 1050° F. are satisfactory. Most satisfactory results are usually achieved with temperatures between 900° and 1000° F. Of course, this is a function of the particular feedstream. Traditionally, the cyclic process utilizes lower pressures and higher temperatures. Hydrogen is circulated or (recycled) through the initial, non-sulfided hydroforming zones at a rate of 1000 to 10,000 standard cubic feet per barrel of liquid naphtha feed. The space velocity, or weight in pounds of feed charge per hour per pound of catalyst, depends upon the activity level of the catalyst, the character of the feedstock, and the desired octane number of the product. Ordinarily, it may vary from about 0.5 w./hr./w. to 15 w./hr./w. and usually from 0.5 to 2 w./hr./w., based on the total catalyst in the system.

The tail reactors, which have been sulfided, will in all probability not necessitate any hydrogen addition or recycle. This represents a substantial improvement and will result in a far more economical process. Under certain circumstances, such as with a hydrocarbon stream containing appreciable cyclopentane homologs (more than about 5 wt. percent) or high boiling components (over 5% boiling above 375° F.), some minor amounts of hydrogen may be added; however, no more than about 1000 standard cubic feet per barrel will ever be necessary. The conditions used in the tail reactors, those containing the sulfided catalyst, will be substantially similar with respect to hydrocarbon feed rate as the initial reactors. The temperature level will be 0 to 200° F. higher than in the initial reactors, and the pressure will be lower, a level as low as 1 atm. being acceptable.

In a preferred embodiment of the instant invention, a train of three hydroforming zones was utilized. The third zone, or tail reactor, was sulfided in the following manner. A hydrocarbon gas containing 0.5–2 vol. percent of $H_2S$ was passed over the catalyst at 800°–1000° F. at a rate of 25–50 standard cubic feet per hour per pound of catalyst for a period of 1–2 hours. A make-up sulfur level of 50–200 p.p.m. was added (as thiophene) with the hydrocarbon feed after the presulfiding step. A feedstream which comprised a naphtha boiling between 150° and 350° F. was introduced into the initial hydroforming zone at a rate of 2 w./hr./w. to 20 w./hr./w. The catalyst within the zone comprised 0.3 to 0.6% platinum or alumina with 0.3 to 1.0% chlorine. On analysis, the feed comprised about 15 to 75 wt. percent of paraffins, 15 to 75 wt. percent of naphthenes, and 2 to 20 wt. percent of aromatics. The initial, or non-sulfided hydroforming zones, which are the first two zones in the train of three, are maintained at a temperature of 800° to 1000° F., a pressure between 100 and 900 p.s.i.g. and a hydrogen recycle rate of 1000 to 10,000 standard cubic feet per barrel of liquid naphtha feed.

After passing through the first two hydroforming zones, the feedstream has been at least partially converted. It now contains about 30 to 70% by wt. of paraffins, 25 to 65% by wt. of aromatics and a maximum of about 10% by wt. of naphthenes. This is critical since the conversion of naphthenes to aromatics is in fact hindered by the sulfided catalyst which is present in the tail reactor. Conversely, the conversion of paraffins to aromatics is not poisoned. The tail reactor contains about 0.05 to 0.35 wt. percent sulfur (expressed as sulfur) on the catalyst; this may become somewhat dissipated by the passage of the feedstream and so additional sulfur may be added, e.g., in the form of thiophene, along with the feedstream. The temperature is maintained at a level of 0° to 200° F. higher than that of the initial reactors. The pressure is maintained at a lower level than that of the initial reactors, and may be as low as 1 atm. After the feed is reformed in the initial hydroforming zones, the effluent from these reactors undergoes a liquid-vapor separation. The gaseous fraction, which is rich in hydrogen, is recycled in part to the inlet of the first reactor and does not pass through the zone containing sulfided catalyst. The liquid fraction is then revaporized and fed to the zone with the sulfided catalyst, no hydrogen stream being recycled to this zone. Following the contacting with the tail reactor, which has been sulfided, the feedstream has the following composition: aromatics, 60 to 99 wt. percent; naphthenes, 0.1 to 5.0 wt. percent and paraffins, 0.9 to 35 wt. percent. Prior to entering the tail reactor, the feedstream had an octane rating of 70 to 95 Research Clear; after passing over the sulfided catalyst, the octane level was increased to 90 to 106 Research Clear.

EXAMPLE 1

In this example, the undesirable effects of a sulfided catalyst on naphthenes is illustrated. About 50 microliters of cyclohexane was passed over 0.50 gram of a sulfided hydroforming catalyst. The catalyst was 0.6% Pt on $Al_2O_3$ and had been sulfided by introducing 5 microliters of thiophene to the catalyst, by simply injecting the thiophene into the carrier gas prior to injecting cyclohexane. Temperature over the catalyst was maintained at 575°–600° F. and pressure was 15 p.s.i.g.; the cyclohexane was injected into a hydrogen gas stream flowing at 1 liter per minute over the catalyst. Immediately after injection of the thiophene, essentially no conversion of cyclohexane to benzene was observed (i.e., the conversion was less than 1%) when a 50 microliter slug of cyclohexane was passed over the sulfided catalyst. The catalyst is clearly not active for naphthene dehydrogenation when it is sulfided. As the sulfur is stripped from the catalyst by the flowing gas, the activity for cyclohexane dehydrogenation gradually increases. The activity of the catalyst as a function of time after sulfiding (with a continuous flow of $H_2$ carrier gas of 1 liter per minute) was determined by successive injections of 50 microliters of cyclohexane into the carrier gas. After 5 minutes, the conversion to benzene was 3.8%; after 10 minutes, it was 8.6%; and after 15 minutes, it was 12.4%. In an operation with continuous addition of make-up sulfur to maintain sulfur on the catalyst, the dehydrogenation activity would clearly be very low.

EXAMPLE 2

In this example, the exact conditions were utilized as had been utilized in Example 1 except that the catalyst was not sulfided. The conversion of cyclohexane to benzene was 35–38%. Clearly, the reactors in a hydroforming train which are used for naphthene dehydrogenation should not contain sulfided catalyst.

EXAMPLE 3

This example serves to illustarte the improvement which is realized when passing normal paraffins over a hydroforming catalyst in order to produce aromatics. A 1% Pt on $SiO_2$ catalyst was sulfided with a vaporized mixture of 1.3% thiophene in n-heptane (in the presence of hydrogen at a $H_2/nC_7$ ratio of 5/1) for 3 hours at 925° F., 200 p.s.i.g., and a space velocity of 20 w./hr./w. The hydrogen flow was then stopped and an inert diluent (helium or nitrogen) was substituted for the hydrogen. The concentration of thiophene in the hydrocarbon feed was also decreased to 50 p.p.m. at this point. The percent conversion and percent selectivity to toluene as a function of time on stream are shown in Table I for an n-heptane space velocity of 1.0 w./hr./w.

TABLE I.—n-HEPTANE AROMATIZATION OVER SULFIDED Pt-SiO$_2$

| Time on stream, hr.[1] | Percent conversion of n C$_7$ | Percent selectivity to toluene |
|---|---|---|
| 5 | 73 | 53 |
| 30 | 59 | 59 |
| 47 | 58 | 58 |
| 72 | 55 | 63 |
| 97 | 51 | 72 |

[1] At hour 52, the feed was switched to a 50:50 mixture of n-heptane and xylenes.

Thus, n-heptane was effectively aromatized to toluene for a period of about 100 hours over the sulfided Pt–SiO$_2$ catalyst with no hydrogen being added to the reactor. The selectivity to toluene is much better than that obtained at conventional reforming conditions, where hydrogen is admitted with the feed. At 925° F., 200 to 400 p.s.i.g., $H_2/nC_7=5/1$, the selectivity to toluene would be only about 20–30% in a conventional reforming operation at n-heptane conversions of 50–70%.

EXAMPLE 4

This example compares the performance of sulfided and non-sulfided Pt–SiO$_2$ catalyst for n-heptane reforming at 925° F., 200 p.s.i.g., and an n-heptane space velocity of 20 w./hr./w., in the absence of extraneous hydrogen. A helium diluent in the amount of 5 moles per mole of $nC_7$ was employed. The sulfided Pt–SiO$_2$ catalyst (1% Pt) was sulfided by the method described in Example 3. Data comparing sulfided and non-sulfided Pt–SiO$_2$ are listed in Table II.

TABLE II.—EFFECT OF SULFIDING ON n-HEPTANE AROMATIZATION OVER Pt-SiO$_2$

| Time on stream, hr. | Percent conversion | |
|---|---|---|
| | Sulfided | Non-Sulfided |
| 2 | 30 | 30 |
| 3 | 27 | 15 |
| 5 | 24 | 7 |
| 23 | 15 | ~0 |
| 50 | 15 | ~0 |
| 95 | 15 | ~9 |

It is clear that the sulfided catalyst maintains its activity much better than does the non-sulfided catalyst in an operation where no hydrogen is admitted to the reactor with the feed. The initial selectivity of conversion to toluene with either the sulfided or non-sulfided catalyst was 60–65%. In the case of the sulfided catalyst, the selectivity remained essentially constant with time on stream. However, the selectivity in the run with the non-sulfided catalyst declined sharply to 30–35% after only five hours on stream. There is clearly a very pronounced effect of sulfiding on the activity and selectivity maintenance of the catalyst, such that sulfiding makes it possible to operate for extended periods of time without addition or recycle of hydrogen to the system.

EXAMPLE 5

In this example, a naphtha feed boiling in the range of 200° to 325° F. was passed over a 0.6% Pt on $Al_2O_3$ hydroforming catalyst. The composition of the feed was:

aromatics, 15 vol. percent; naphthenes, 40 vol. percent; and paraffins, 45 vol. percent. This feed was hydroformed at 940° F., 200 p.s.i.g., and at a molar ratio of hydrogen to hydrocarbon feed of 5/1, at two different space velocities, 15 w./hr./w. and 2 w./hr./w., to give $C_5^+$ reformates of 85.6 and 102 research clear octane number, respectively. The yields of 85.6 and 102 octane number reformates were 91.0 and 79.6 vol. percent on feed, respectively.

The 85.6 octane number reformate, containing 4.5 wt. percent naphthenes, was reformed over a sulfided 1% Pt on $SiO_2$ catalyst at 925° F., 200 p.s.i.g., and at a molar ratio of nitrogen to hydrocarbon feed of 5/1, at a space velocity of 1 w./hr./w. The catalyst was presulfided by passing 200°–325° F. naphtha containing 0.8 wt. percent sulfur (as thiophene) over the catalyst for three hours at a space velocity of 8 w./hr./w. while raising the temperature of the catalyst from 800° to 925° F., at a total pressure of 200 p.s.i.g., and a hydrogen to naphtha mole ratio of 5/1. After the presulfiding step was completed, the 85.6 octane number reformate, containing 50 p.p.m. of make-up sulfur (as thiophene), was introduced to the reactor with nitrogen replacing the hydrogen as diluent. A $C_5^+$ reformate of 102 research clear octane number was obtained at a yield of 91.8 vol. percent. The overall yield from the two-step process of mild hydroforming to 85.6 octane number plus subsequent reforming over the sulfided Pt–$SiO_2$ catalyst is thus $0.918 \times 91.0 = 83.6$ vol. percent, which represents a yield advantage of 4.0 vol. percent over severe conventional hydroforming to 102 octane number with the Pt/$Al_2O_3$ catalyst.

This example serves to illustrate the substantial improvement which may be gained by reforming a hydrocarbon fraction, which has a low naphthene level, over a sulfided hydroforming catalyst in the absence of hydrogen. This advantage is not realized if the naphthene level is above 10% by wt. or preferably at a maximum of 5% by wt. As illustrated in Examples 1 and 2, the sulfided catalyst serves to inhibit the conversion of naphthenes to aromatics and so this reaction should be substantially complete by the time the feedstream is contacted with the sulfided catalyst.

Although this invention has been described with some degree of particularity, it is intended only to be limited by the attached claims.

What is claimed is:

1. A process for catalytically reforming a hydrocarbon feedstream boiling in the gasoline range and containing 15–75% naphthenes and 85–25% paraffins and aromatics which comprises passing said feedstream and a hydrogen-rich gas at reforming conditions in a first reaction zone over a catalyst consisting of a platinum group metal and a refractory support, whereby at least 90% of the naphthenes are converted to aromatics, separating the effluent from said zone into a liquid fraction and a vapor fraction rich in hydrogen, passing said liquid fraction in a second reaction zone over a catalyst consisting of sulfided platinum group metal catalyst on a refractory support and recovering a gasoline of high octane value.

2. The process of claim 1 in which the feed to the second reaction zone contains a sulfur compound chosen from the group consisting of hydrogen sulfide, thiophene, carbon disulfide, mercaptans, organic disulfides and benzothiophene sufficient to deposit 0.01 to 2.0 wt. percent sulfur on the catalyst.

3. The process of claim 2 in which the feed to the tail reactor contains thiophene.

4. The process of claim 3 wherein said refractory support is selected from the group consisting of alumina and silica.

References Cited

UNITED STATES PATENTS

| | | | |
|---|---|---|---|
| 2,659,701 | 11/1953 | Heard et al. | 252—439 |
| 2,946,737 | 7/1960 | Potas | 208—65 |
| 2,956,945 | 10/1960 | Fleming et al. | 208—65 |
| 3,006,841 | 10/1961 | Haensel | 208—139 |
| 3,007,862 | 11/1961 | Patton et al. | 208—65 |
| 3,224,962 | 12/1965 | Baldwin | 208—139 |
| 3,287,253 | 11/1966 | McHenry et al. | 208—65 |

DELBERT E. GANTZ, *Primary Examiner.*

H. LEVINE, *Assistant Examiner.*

U.S. Cl. X.R.

208—138